United States Patent
Isaac et al.

(10) Patent No.: US 7,209,490 B2
(45) Date of Patent: Apr. 24, 2007

(54) RAPID VEHICLE BUS NETWORK ACTIVITY

(75) Inventors: Emad Isaac, Woodrdge, IL (US); Tim R. Van Goethem, Crystal Lake, IL (US); Ramy P. Ayoub, Arlington Heights, IL (US); Robert F. D'Avello, Lake Zurich, IL (US)

(73) Assignee: Temic Automotive of North America, Inc., Deer Park, IL (US)

( * ) Notice: Subject to any disclaimer, the term of this patent is extended or adjusted under 35 U.S.C. 154(b) by 404 days.

(21) Appl. No.: 10/883,163

(22) Filed: Jul. 1, 2004

(65) Prior Publication Data

US 2006/0050735 A1    Mar. 9, 2006

(51) Int. Cl.
*H04L 12/42* (2006.01)
(52) U.S. Cl. .................................... 370/457
(58) Field of Classification Search ............... 370/452, 370/457; 702/182
See application file for complete search history.

(56) References Cited

U.S. PATENT DOCUMENTS

| | | | | |
|---|---|---|---|---|
| 4,538,263 | A | * | 8/1985 | Gabrielli et al. ............ 370/445 |
| 4,747,100 | A | * | 5/1988 | Roach et al. ................ 370/452 |
| 5,351,041 | A | * | 9/1994 | Ikata et al. .................. 370/457 |
| 5,751,938 | A | | 5/1998 | Wendorff |
| 5,864,781 | A | * | 1/1999 | White ......................... 702/182 |
| 6,396,164 | B1 | | 5/2002 | Barnea et al. |
| 6,823,457 | B1 | | 11/2004 | Berstis |
| 6,854,053 | B2 | * | 2/2005 | Burkhardt et al. ........... 370/457 |
| 6,924,750 | B2 | | 8/2005 | Flick |
| 2004/0243257 | A1 | | 12/2004 | Theimer |

\* cited by examiner

*Primary Examiner*—Doris H. To
*Assistant Examiner*—Phuongchau Ba Nguyen
(74) *Attorney, Agent, or Firm*—Brian M. Mancini; Thomas V. Miller; Gary J. Cunningham

(57) ABSTRACT

An apparatus and method for rapidly providing activity on a vehicle network bus includes a node having a bus connection to the vehicle network bus. The node includes a Rapid Response Stack loaded with the predetermined message to respond to any network bus request before the application is up and running. A true stack is loaded with real messages from the application once it is booted up and running on the node, whereupon the application subsequently responds to network bus requests using the true stack instead of the Rapid Response Stack.

24 Claims, 2 Drawing Sheets

RAPID VEHICLE BUS NETWORK ACTIVITY

FIELD OF THE INVENTION

Generally, this invention relates to vehicles that use a network bus connected to communication nodes, and more specifically, to a rapid method and apparatus for providing activity on the vehicle bus.

BACKGROUND OF THE INVENTION

Motor vehicles have seen a tremendous increase in the use of in-vehicle electronics. Many of these in-vehicle electronics are adapted to provide the vehicle driver and occupants with a vast amount and array of data and information via wireless communication technology, and to allow them to communicate data and information outside of the vehicle also using wireless technology. An example of these electronics devices are on-board navigation systems, remote vehicle diagnostic systems, real-time weather service, voice communication, Internet access, e-mail and paging. However, since the design cycle for the typical motor vehicle is relatively long as compared to the design cycle for new electronic devices, new state-of-the art electronic products are available but may not be readily adaptable to the motor vehicle.

Many motor vehicles are designed with an original equipment manufacturer (OEM) communication bus structure that allows electronic devices on the bus to communicate with each other and with device controllers and with other vehicle systems connected to the bus over bus connection nodes. The bus structure, however, typically operates using a proprietary communication protocol. In addition, in view of the many governmental requirements for vehicle certification, safety, fuel economy, emissions, etc., and the possibility of adverse interactions between devices with the vehicle systems, the OEMs ensure that the devices operate properly on the OEM bus before manufacturing the vehicle.

Along these lines, a bus master may be provided for the OEM bus that permits a limited amount of interaction between the various electronic devices and the OEM bus. There are bus masters in most vehicle bus topographies that coordinate and regulate the interactions between the vehicle components on the bus. The bus requirements are normally very stringent to ensure compliance with safety, regulatory and functionality requirements. Failure to meet these bus requirements can cause a vehicle to malfunction. The cost and effort required to implement these bus requirements in a vehicle device connected to the bus is excessively high. In order to meet these requirements, device suppliers have historically implemented expensive hardware and software solutions (e.g. proprietary operating systems). For example, the OEM bus has stringent requirements for connected devices meeting boot time requirements, e.g. less than fifty milliseconds. If there are devices that do not respond on the bus within the allotted time, the bus master will assume that there is a bus problem and will either shut down the bus or request the faulty device to disconnect from the bus. Either situation is unacceptable. However, for some complex devices, such as Telematics control units, it is difficult to attain these boot time requirements given the complexity of the boot up sequences in current operating systems.

Thus there is a need for an apparatus and method for providing a rapid response for vehicle bus activity, even before a device node has booted up. It would also be of benefit to provide a seamless transition of the device node to a fully booted condition. Further, it is desirable to provide this improvement with a minimal change of software and/or hardware.

BRIEF DESCRIPTION OF THE DRAWINGS

The features of the present invention, which are believed to be novel, are set forth with particularity in the appended claims. The invention, together with further objects and advantages thereof, may best be understood by making reference to the following description, taken in conjunction with the accompanying drawings, in the several figures of which like reference numerals identify identical elements, wherein:

DETAILED DESCRIPTION OF THE PREFERRED EMBODIMENTS

The present invention provides an apparatus and method for providing a rapid response for vehicle bus activity, even before a device node has booted up. This is done by the device node providing acceptable, predetermined stored messages that may not be actual true responses, to the bus before the boot up initialization sequence is complete. After boot up is completed, the node provides a seamless transition of the device node to respond with appropriate, true messages. The above advantages are accomplished with a minimal change of operating instructions and no additional hardware. In this way, cost is minimized.

Figure 1:
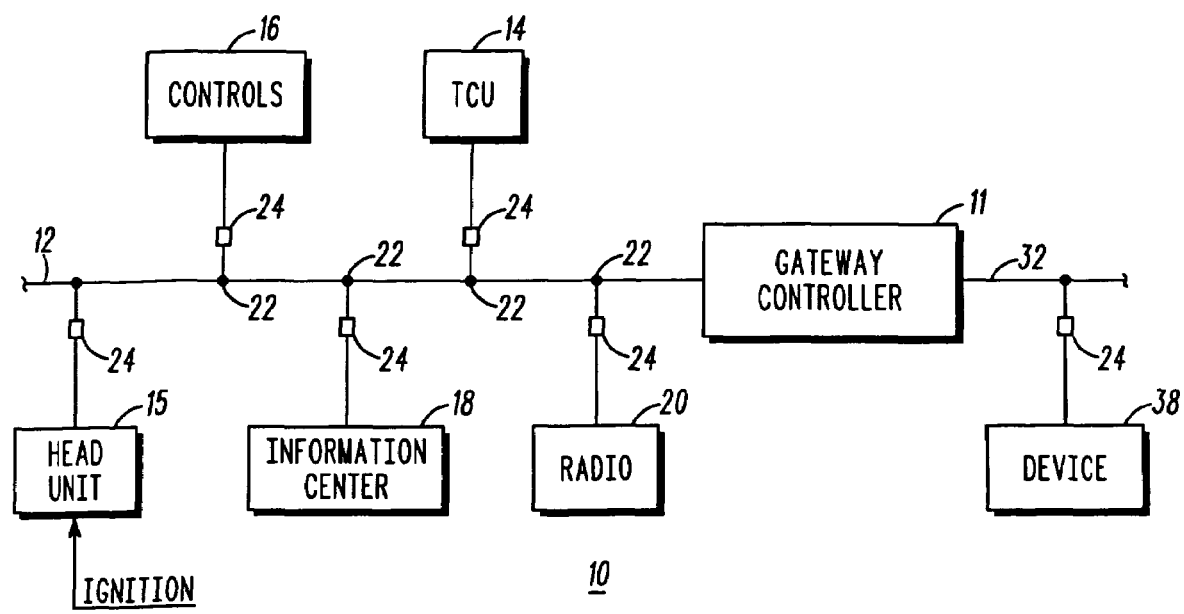
FIG. 1 shows a block diagram of a system overview, in accordance with the present invention.

Referring to FIG. 1, a vehicle electrical system 10 includes an original equipment manufacturer (OEM) data bus, vehicle bus 12. The vehicle bus can be a linear configuration, as shown, or a closed ring configuration, to which various electronic devices are coupled. For example, the vehicle bus can be a Controller Area Network (CAN) or a fiber optic Media-Oriented Systems Transport ring bus (MOST), as are known in the art. The devices can communicate in a peer-to-peer configuration or one of the devices can act as a master device, such as head unit 15, wherein the other devices act as slave devices. In addition, one of the devices 11 can act as a gateway controller of the vehicle bus 12 providing communication with further devices 38 on a separately connected bus 32. Other electronic devices coupled to the vehicle bus 12 can be a vehicle radio 20, a driver's information center 18 that includes a suitable display, such as a light emitting diode (LED) or liquid crystal (LC) display that may provide text and graphic information to the driver, a Telematics control unit 14, vehicle controls 16, such as steering wheel mounted switches, HVAC controls, and the like.

Each of the electronic devices is connected to the bus at a bus connection node 22. In addition, each of the electronic devices is individually addressable on the bus 12, and each device can further include memory for retaining operating information. In operation, each node on the bus can check for any other nodes on the bus to determine if the bus is operational. For example, the head unit 15 can send a "check" message to a particular node or globally to all the nodes to obtain a response indicating that the bus is operational. If the bus is not operational, the bus can be shut down or the offending node can be disconnected from the bus for protection. Each node operates independently from the other nodes and contains its own operating system, application, and message stack. The message stack stores messages in the node buffer 24 for use by the application. For example, in response to a query by the head unit 15 to the information center 18, the application of the information center can direct an appropriate reply message from the stack in the node buffer 24 be sent on the vehicle bus 12. The head unit 15 will only power up all the bus 12 if there is a positive indication that the bus is operating properly.

The vehicle bus 12 can be coupled, through the gateway controller 11, with the separate device bus 32, which in turn can be coupled to numerous additional electronic devices such as pager, cellular telephone and other electronic devices generally indicated as device 38. The other devices that may be coupled to the device bus 32, without limiting the number or type of devices, include navigation systems, infrared transceivers, personal computers, personal digital assistants, communication/data ports or docking stations, and the like. In addition, the devices coupled to the device bus 32 may communicate on a peer-to-peer basis permitting the device bus 32 to operate without a separate gateway controller. While the preferred embodiment shown in FIG. 1 shows the electronics devices coupled to the gateway 30 by way of the device bus 32, it will be appreciated that the device bus 32 may not be necessary and the electronic devices may be coupled directly to another device (e.g. head unit 15) or to vehicle bus 12 directly.

Each of the devices connected to the vehicle bus can be independent, having their own operating system and operational application. Therefore, these devices can exhibit widely different boot up times when the vehicle is started. This is particularly true of the Telematics control unit 14, which has a large and complex source code where it is difficult to meet the boot time requirements given the complexity of the boot up sequences in current operating systems. Moreover, the Telematics system has warm and cold boot up sequences. In warm boot up, the memory is intact and state information is preserved. For cold boot up, there is no initial startup conditions or data in memory and thereby no knowledge of a prior state of the node. In either case boot up time can be too long for the bus requirements.

When power is applied (i.e. starting the ignition of the vehicle and applying power to the head unit 15), the bus master may begin a device discovery procedure to determine what devices are on the bus 12. Some protocols require the devices to report an identification in response to the discovery queries that are initiated by the bus master. Other protocols allow for intermediate messaging to delay the response of the query once the query is received. Depending on the protocol, some queries must be responded to (or messages must be sent) within as little as fifty milliseconds after power up, for example. In particular, many OEM devices, such as the head unit 15, demand that all the devices operate properly on the OEM bus. If a queried device, such as the Telematics device 14, is not up and running, it will not be able to respond to the query on the bus within the allotted time, and the requesting device will assume that there is a bus problem and either shut down the bus, reset the bus, reset itself, disconnect itself from the bus for protection, or exclude the non-responsive device from further participation in the system. The bus master will only power up the entire bus if it first determines that the bus is operational.

In addition to the "Cold Start" requirements, the devices are required to respond to queries, during normal operations, within a very short period of time (e.g. less than one millisecond) in some bus protocols. This precludes most devices from entering very low power states during normal operation, since the response time to bus messaging is very small. The consequences of not responding to a message may be the exclusion of the "slow responding" device from the vehicle bus.

The present invention provides a solution to the boot time requirements by providing a predetermined, acceptable, message to the vehicle bus, before the device is fully booted up and operational. In particular, a Rapid Response Stack is provided with a set of predetermined messages for use in responding to queries on the bus. The Rapid Response Stack retrieves predetermined, configurable, messages to reply to queries while the main operating system of the node is still initializing. This is particularly suitable for devices, such as the Telematics control unit, having large and complex boot up procedures. This invention will also provide a means to allow vehicle devices to enter very low power states without risk of violating the messaging response time requirements of the vehicle bus.

In general, the present invention includes a system that rapidly provides activity on a vehicle network bus upon power up. The system includes a first node, such as bus master 15, for the vehicle network bus 12, and a second node (e.g. TCU 14, 24) coupled to the vehicle network bus 12 through a bus connection 22. The vehicle network bus can also include the device bus 32. An operating system and application are provided that are operable on the second node (e.g. TCU 14). The operating system boots from firmware, such as a hardware memory of the node. A message stack 24 is used to provide messages to the bus 12.

The memory includes at least one predetermined message stored thereon. The predetermined messages are used to fill the Rapid Response Stack with messages that the vehicle bus will find acceptable, even though they may not reflect the actual status or condition of the node at the time. For example, the predetermined messages can be registration messages, identification messages, and/or configuration messages. Upon powering up, a core kernel of the operating system is loaded and directs the memory of the node to load the Rapid Response Stack with the at least one predetermined message from the memory. It should be recognized that there are numerous ways to instantiate the Rapid Response Stack, such as using hardware instantiation, through a bootloader, or early in the kernel boot sequence. The Rapid Response stack is used to quickly respond to any network bus request from the bus master or any node by having the application place the predetermined message from the Rapid Response Stack of the node on the network bus. In practice, the predetermined message is loaded in the stack ready to respond to queries in less than fifty milliseconds. In addition, the messages in the Rapid Response Stack can be broadcast on the bus without an initial query from another device on the bus, or placed on the bus in response to any query received from another device, such as the head unit. By having the stack respond with predefined messages, embedded systems can register with the vehicle networks as architected without having to wait until the entire operating system and memory of each node are configured and operational.

Once the operating system has completed boot up and the node application is up and running, a true stack of the node is loaded with real messages from the application, whereupon the application subsequently responds to network bus requests using the true stack instead of the Rapid Response Stack. The application will have the ability to enable and disable the true and Rapid Response Stacks. The true stack and Rapid Response Stacks can be separate stacks of either a hardware or software configuration, or more simply the same message stack wherein the Rapid Response messages are disabled, and the stack utilizes actual messages provided by the application. Preferably, the Rapid Response stack is a hardware stack, implemented in a low cost device such as an application specific integrated circuit or similar.

Upon powering up, the node hardware, such as Telematics Control Unit 14, will monitor the vehicle bus for predefined messages and automatically respond with identification and configuration parameters to authenticate and register the embedded device onto the vehicle bus. Once the node application software is initialized and running, the automatic Rapid Response Stack hardware response scheme can be disabled, allowing the application software to interact with the vehicle bus either directly with the vehicle bus through an actual, true message stack.

Specifically, the node first determines if the bus has some activity thereon before powering up. The node can then load the Rapid Response Stack while initializing the operating system. Once the Rapid Response Stack is loaded, the node is then ready to place messages on the bus using the Rapid Response Stack. In a preferred embodiment, the node also determines a network configuration of the vehicle. In this way, the node will know what devices are on the bus and configure the stack messages accordingly, for efficiency. For example, the messaging parameters, and also the predetermined messages, can be adjusted based on the network configuration of the vehicle.

In a more preferred embodiment, the predetermined messages of the Rapid Response Stack are mapped to specific interrupt request codes to provide a more meaningful response to queries. In addition, the predetermined message (and message parameters such as time delay between messages) and message sequences can be initially set at the time of the design of the device but can also be adaptable to be set at runtime for subsequent boots.

Furthermore, the Rapid Response Stack can leave messaging information for the true stack, through means well known in the arts, such as shared memory. This messaging information will capture a history of the Rapid Response Stack's sent and received messages to see what was done previously and react properly, in order to allow the true stack and application to assess the state and history of the bus interface and adjust its state information so that it can seamlessly transition into the role as a true stack. In particular, the true stack will reading the boot up message history of the Rapid Response Stack. Preferably, the true stack can adjust the predetermined messages and messages parameters, based on the history of the received and sent messages, to improve the response of the Rapid Response Stack on the system during the next boot procedure. The true stack can also adjust its true messaging based on the history.

More specifically, the present invention includes a node (e.g. 14, 24) that rapidly provides activity on a vehicle network bus. The node includes a bus connection 22 to the vehicle network bus 12. An operating system and application are provided that are operable on the node (e.g. TCU 14). The operating system boots from firmware, such as a hardware memory of the node. A message stack 24 is used to provide messages to the bus 12.

The memory includes at least one predetermined message stored thereon. The predetermined messages are simple messages that the vehicle bus will find acceptable, even though they may not reflect the actual status or condition of the node at the time. For example, the predetermined messages can contain registration messages, identification messages, and/or configuration messages. Upon powering up, the bootloader can install and initialize the false Rapid Response driver, depending on the implementation. In another scenario, a core kernel of the operating system is loaded and directs the memory of the node to load a Rapid Response stack of the predetermined message from the memory. In yet another scenario the hardware may be configured to enable the Rapid Response stack at power up. The Rapid Response stack is used to quickly respond to any network bus request from the bus master by having the application place the predetermined message from the Rapid Response stack of the node on the network bus. In practice, the predetermined message is loaded in the Rapid Response stack ready to respond to the bus master in less than fifty milliseconds. In addition, the Rapid Response messages can be broadcast on the bus without an initial query from another device on the bus, or placed on the bus in response to any query received from another device, such as the bus master (e.g. head unit). By having the stack hardware respond with predefined messages, embedded systems can register with the vehicle networks as architected without having to wait until the entire operating system and memory of each node are configured and operational.

Figure 2:
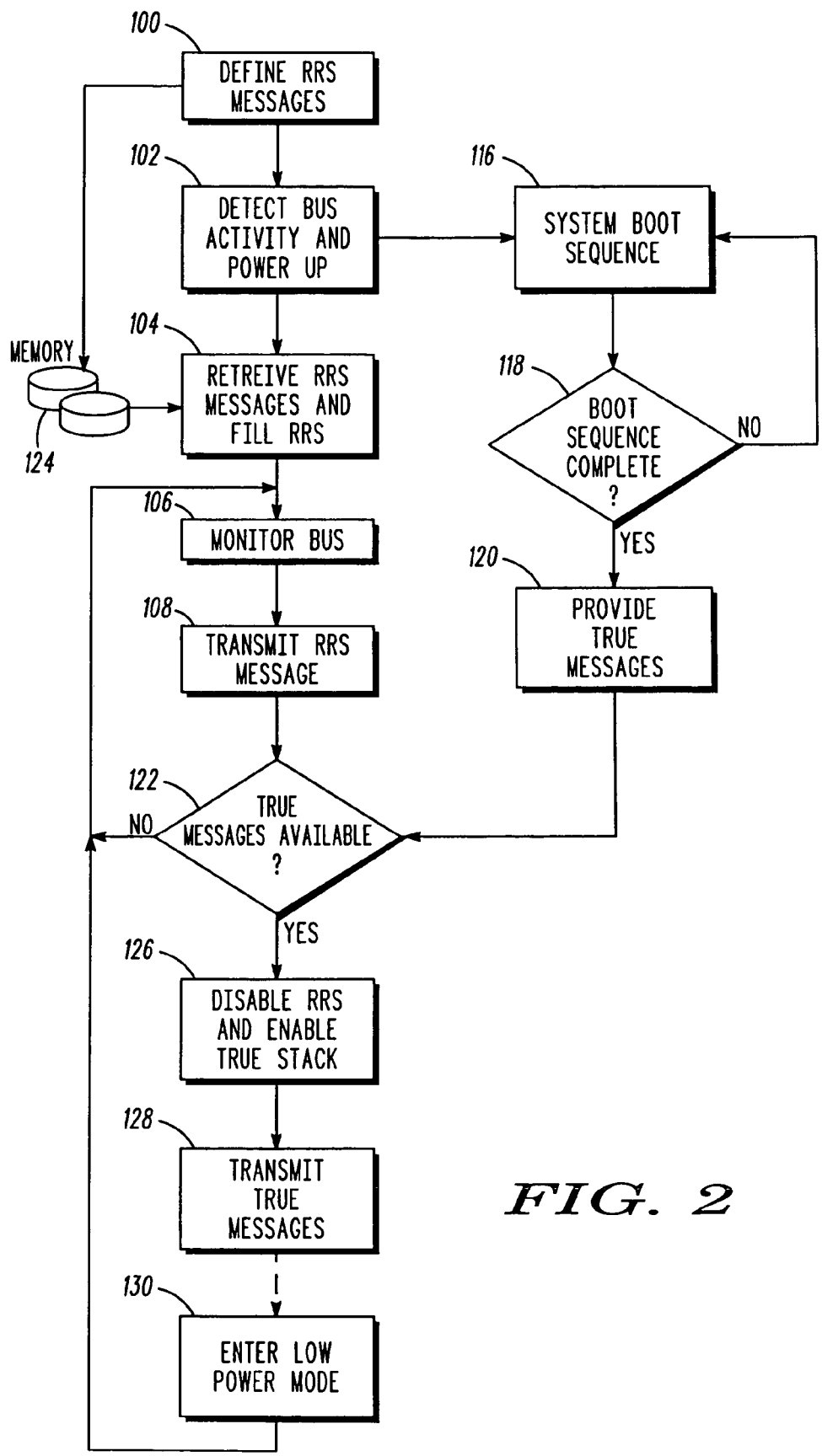
FIG. 2 is a flow chart showing a method, in accordance with the present invention.

With reference to FIG. 2, the present invention also includes a method for a node on a vehicle network bus to rapidly provide activity thereon. A first step 100 includes storing at least one predetermined message in a memory 124 of the node. This is done before power is applied to the node, and can be provided during manufacture of the node. The predetermined messages are simple, false messages that the vehicle bus will find acceptable, even though they may not reflect the actual status or condition of the node at the time. For example, the predetermined messages can contain registration messages, identification messages, and/or configuration messages. The predetermined messages can also be supplemented with message parameters The message parameters contain configurable information regarding the Rapid Response Stack's handling of received and sent messages. These parameters will include information such as the timing delay to be used in conjunction with message transmissions, and order of messages to be sent at initialization. A message parameter table can be used that contains information mapping messages that are to be sent in response to particular received messages, such as interrupt codes. In addition, the Rapid Response Sack has protocol layers required to sustain communications with the vehicle bus during boot up.

A next step 102 includes powering up the node of the vehicle network bus. System power is typically provided upon vehicle start up. A bus master can then power up all or portions of the bus. The node detects any activity (communication or power) on the bus and powers up, beginning initialization of the boot up sequence 116. A next step 104 includes retrieving the filling a Rapid Response Stack (RRS) of the node with the at least one predetermined message from the memory 124. Specifically, upon powering up 100, assuming an implementation of the RRS in the run-time operating system, a core kernel of the operating system is loaded and in turn loads the Rapid Response Stack with the predetermined messages from the memory. The Rapid Response Stack is used to quickly respond to any network bus request from the bus master or any other node by having the node place a predetermined message from the Rapid Response Stack of the node on the network bus. Preferably, the vehicle configuration is also obtained during this step 104 such that the proper message can be obtained for the various devices on the vehicle bus.

An optional next step 106 is monitoring the bus for queries. This step can include looking up a proper responses in the RRS for a received query. A next step 108 includes transmitting a predetermined message from the Rapid Response Stack of the node on the vehicle network bus for other nodes, or a requesting node, to read. This can be done as a broadcast or in response to query received in the monitoring step 106. The message can be a general message or can be one tailored to particular requests. Preferably, the step 108 includes storing a history of sent messages for later retrieval by the application. The transmitting step 108 can be performed before the operating system is completely booted up 118 and true messages 120 are available. In particular, the predetermined messages are made available on the bus within fifty milliseconds. These messages can be broadcast on the bus from the Rapid Response Stack of the node without an initial query from another device on the bus, or placed on the bus from the Rapid Response Stack of the node in response to any query received from another device, such as the head unit, for example. Moreover, the RRS can place the predetermined message from the Rapid Response Stack of the node on the vehicle network bus in accordance with the boot up messaging parameters. By having the stack hardware respond with predefined messages, embedded systems can register with the vehicle networks as architected without having to wait until the entire operating system and memory of each node are configured and operational.

While the Rapid Response messages are made available 108 on the bus the node continues its operating system boot up sequence 116 until the boot up sequence is complete 118 and the node application software is up and running. Once the operating system is completed booted up and the node application is up and running 118, the application determines the status of the bus activity by looking at the message history of the false stack, and determines what should be the next course of action by the driver in order to transition into the role of the true bus interface. The application can then provide 120 a complete, true stack. Once the true stack is active 122 (and the vehicle bus is active), the node application can subsequently respond to network bus requests using the true stack instead of the Rapid Response stack. This is done by disabling 126 the Rapid Response Stack through the exchanging or switching of the node to the true stack from the Rapid Response Stack such that true messages are available 128 to the network bus.

The present invention allows embedded systems to register with an in-vehicle network within an architected specification. By providing proper bus operation, network-related configurations can be performed with out service interruptions of the network data stream. For example, an audio channel configuration can be completed without introducing audio artifacts. The present invention relieves the boot up time burden from the real time operating systems of devices on the vehicle bus.

This invention also supports the entering 130 of a low power state of the node by allowing the enablement of the hardware-based Rapid Response Stack, and the disablement of the software based true stack. The application will prepare for the power down mode by initializing the Rapid Response Stack and notifying the stack that the device is entering low power mode. An alternative set of Rapid Response messages may be defined for the specific low power state, since start up messages will not be expected from the bus during this time. In this case, the low power specific predetermined messages can be used communicate on the vehicle bus while the node is in the low power state. Further, the low power specific predetermined message parameters could be retrieved while the node is in the low power state. Before the device enters the low power state, the application will enable the Rapid Response Stack and disable the true stack. The Rapid Response Stack will handle all bus activity traffic until either the system is shut down or bus activity dictates that the application should come out of the low power state and resume normal execution. The RRS will have the capability of waking up the node to resume normal operation. In particular, the RRS can wake up the node from the low power state upon receiving a specific message from the vehicle bus, wherein the Rapid Response Stack is disabled and the true stack is enabled. In a preferred embodiment, all of the previous discussion relating to the operation is equally applicable to a normal operating state and a low power operating state.

While the present invention has been particularly shown and described with reference to particular embodiments thereof, it will be understood by those skilled in the art that various changes may be made and equivalents substituted for elements thereof without departing from the broad scope of the invention. In addition, many modifications may be made to adapt a particular situation or material to the teachings of the invention without departing from the essential scope thereof. Therefore, it is intended that the invention not be limited to the particular embodiments disclosed herein, but that the invention will include all embodiments falling within the scope of the appended claims.

What is claimed is:

1. A method for a node on a vehicle network bus to rapidly provide activity thereon, the method comprising the steps of:
defining and storing at least one predetermined message in a memory of the node;
powering up the node of the vehicle network bus;
filling a rapid response stack of the node with the predetermined message from the memory; and
transmitting the predetermined message from the rapid response stack of node on the vehicle network bus for other nodes to read.

2. The method of claim 1, further comprising the steps of:
booting up the node such that an application begins running thereon;
providing a true stack of messages from the application running on the node; and
switching the node to the true stack from the Rapid Response Stack such that true messages are available to the network bus.

3. The method of claim 2, further comprising the step of reading the boot up message history of the Rapid Response Stack.

4. The method of claim 2, further comprising the step of adjusting messaging on the vehicle bus based on the historical messaging of the Rapid Response Stack.

5. The method of claim 2, further comprising the step of adjusting at least one of the messaging parameters and the predetermined messages, based on the history of the received and sent messages, to improve the response of the Rapid Response Stack on the system during the next boot procedure.

6. The method of claim 1, further comprising the step of monitoring the bus for for queries.

7. The method of claim 1, wherein the transmitting step includes broadcasting broadcasting the predetermined message from the Rapid Response Stack of the node on the vehicle network bus.

8. The method of claim 1, wherein the transmitting step includes placing the predetermined message from the Rapid Response Stack of the node on the vehicle network bus in response to a query from another node.

9. The method of claim 1, wherein the transmitting step includes placing the predetermined message from the Rapid Response Stack of the node on the vehicle network bus in accordance with boot up messaging parameters.

10. The method of claim 1, further comprising the steps of determining a network configuration of the vehicle and using the network configuration to adjust at least one of messaging parameters and the predetermined messages.

11. The method of claim 1, further comprising the step of storing transmitted messages of the Rapid Response Stack into a history buffer.

12. The method of claim 1, further comprising the step of entering a low power mode wherein the Rapid Response Stack is enabled and the true stack is disabled.

13. The method of claim 12, wherein the defining step includes defining low power specific predetermined messages to communicate on the vehicle bus, and wherein the filling step includes retrieving and filling the low power specific predetermined message parameters in the Rapid Response Stack to communicate on the vehicle bus while the node is in the low power state, and wherein the transmitting step includes transmitting the low power specific predetermined messages while the node is in the low power state.

14. The method of claim 12, further comprising a step of waking up the node from the low power state upon receiving a specific message from the vehicle bus, wherein the Rapid Response Stack is disabled and the true stack is enabled.

15. A system that rapidly provides activity on a vehicle network bus, the systemcomprising:
   a first device coupled to the vehicle network bus;
   a second device with a node coupled to the vehicle network bus through a bus connection;
   an operating system and application that are operable on the node;
   a memory of the node, the memory with at least one predetermined message stored thereon;
   a Rapid Response Stack of the node that is loaded with the predetermined messages from the memory before the node is completely initialized, wherein the Rapid Response Stack is used to respond to any network bus request from the first device by having the Rapid Response Stack transmit a predetermined message from the Rapid Response Stack of the node on the network bus; and
   a true stack of the node that is loaded with real messages from the application once it is running on the node, whereupon the application subsequently responds to network bus requests using the true stack instead of the Rapid Response Stack.

16. The system of claim 15, wherein the application enters a low power mode wherein the Rapid Response Stack is enabled and a true stack is disabled.

17. The system of claim 15, further comprising the step of storing transmitted messages of the Rapid Response Stack for later retrieval by the application.

18. The system of claim 15, wherein the node determines a network configuration of the vehicle.

19. A node that rapidly provides activity on a vehicle network bus, the node comprising:
   a bus connection to the vehicle network bus;
   an operating system and application operable to run thereon;
   a memory with a predetermined message stored thereon;
   a Rapid Response Stack that is loaded with the predetermined message from the memory upon powering of the node, wherein the Rapid Response Stack is used to respond to any network bus request by the node transmitting the predetermined message from the Rapid Response Stack on the network bus; and
   a true stack that is loaded with real messages from the application once it is running on the node, whereupon the application subsequently responds to network bus requests using the true stack instead of the Rapid Response Stack.

20. The node of claim 19, wherein the node stores a history of messages sent by the Rapid Response Stack into the memory, and wherein the application loads the history for use in adjusting at least one of messaging parameters and predetermined messages.

21. The node of claim 19, wherein the node determines a network configuration of the vehicle and adjusts at least one of the group of the messaging parameters and the predetermined messages.

22. The node of claim 19, wherein the node enters a low power mode wherein the Rapid Response Stack is enabled and the true stack is disabled.

23. The node of claim 22, wherein the Rapid Response Stack is filled with a low power specific predetermined messages and a low power specific predetermined parameters corresponding to the low power state of the node, which are transmitted while the node is in the low power mode.

24. The node of claim 22, wherein the node wakes from the low power mode upon receiving a specific message from the vehicle bus, wherein the Rapid Response Stack is disabled and the true stack is enabled.

* * * * *